United States Patent [19]

Chen

[11] Patent Number: 5,625,499
[45] Date of Patent: Apr. 29, 1997

[54] ACHROMATIC AND APOCHROMATIC PRISM ELEMENT EMPLOYING PRISMS AND GRATINGS

[75] Inventor: Chungte W. Chen, Irvine, Calif.

[73] Assignee: Hughes Aircraft Company, Los Angeles, Calif.

[21] Appl. No.: 590,963

[22] Filed: Jan. 24, 1996

Related U.S. Application Data

[63] Continuation of Ser. No. 279,769, Jul. 25, 1994, abandoned, which is a continuation of Ser. No. 989,417, Dec. 11, 1992, abandoned.

[51] Int. Cl.$^6$ ............................................. G02B 5/04
[52] U.S. Cl. .................... 359/831; 359/837; 359/569; 359/615
[58] Field of Search ........................ 359/566, 569, 359/571, 572, 576, 615, 831, 833, 837

[56] References Cited

U.S. PATENT DOCUMENTS

| | | | |
|---|---|---|---|
| 2,818,765 | 1/1958 | Foster | 359/831 |
| 3,900,263 | 8/1975 | Hall, Jr. | 359/837 |
| 4,411,492 | 10/1983 | Bluege | 359/833 |
| 4,776,652 | 10/1988 | Ih | 359/16 |
| 4,872,747 | 10/1989 | Jalkio | 359/831 |
| 5,101,458 | 3/1992 | Spaulding et al. | 359/831 |

FOREIGN PATENT DOCUMENTS 4214014  11/1992  Germany.

OTHER PUBLICATIONS

B. Nelles and E.H. Geyer, "Distortion of grating prisms, and their use in radial velocity determinations of astronomical objects with slitless field spectrographs", Alpplied Optics, vol. 20, No. 4, 15 Feb. 1981, pp. 660–664.

*Primary Examiner*—Georgia Y. Epps
*Assistant Examiner*—Dawn-Marie Bey
*Attorney, Agent, or Firm*—Gordon R. Lindeen, III; Wanda K. Denson-Low

[57] ABSTRACT

An apochromatic grism (42) includes a first prism (48) with a second prism (50) disposed adjacent to it. A grating (44) is adjacent to the front surface of the first prism (48) and the Abbe number and dispersion coefficient of the grating are chosen such that the primary and secondary angular spread for a given spectral band is approximately zero. The apochromatic grism is a simple and compact device with minimal amounts of residual chromatic and anamorphic aberrations.

10 Claims, 2 Drawing Sheets

5,625,499

ACHROMATIC AND APOCHROMATIC PRISM ELEMENT EMPLOYING PRISMS AND GRATINGS

This is a continuation application Ser. No. 08/279,769, filed Jul. 25, 1994, now abandoned, which is a continuation of application Ser. No. 07/989,417, filed Dec. 11, 1992, now abandoned.

CROSS REFERENCE TO RELATED APPLICATION

The present invention contains subject matter which is related to co-pending U.S. Patent Application entitled "A Grism (Grating-Prism Combination)" Ser. No. 07/993,344 which is assigned to the same assignee as the present application.

BACKGROUND OF THE INVENTION

1. Technical Field

This invention relates to a technique for reducing aberrations in optical systems, and more particularly to a simple and compact optical element employing the combination of a grating and a prism.

2. Discussion

The prism has long been one of the very basic optical components in many optical systems. It is a very fundamental optical component for many applications such as altering beam direction, zooming, correcting anamorphic aberration and correcting line of sight errors. The applications also include infrared detection, head-up display (HUD), helmet mounted display (HMD), laser radar, commercial cinematography, etc. Unfortunately, the generic dispersion characteristics of a prism limits its applications. That is, because of the variation in index of refraction and dispersion with wavelength, prisms are often not useful in applications involving a wide spectral range of optical radiation. These dispersion characteristics result in optical chromatic aberrations, that is, a departure of the image-forming system from the ideal behavior occurring when a beam passes through a system. In particular, prisms are prone to chromatic aberrations which results from the variation in the index of refraction with wavelength. Chromatic aberration will severely degrade the image quality of an optical system.

However, aberration of an optical component has both a positive and a negative contribution, and if these contributions are balanced, the total aberration of the system can be tolerably small. For example, achromatic and apochromatic prisms take advantage of this approach. Achromatic prisms, which correct for two wavelengths, consist of a pair of prisms with different dispersion coefficients and different prism angles. Apochromatic prisms, which correct for three wavelengths, usually employ two pairs of prisms with at least three different glass materials. While apochromatic prisms attempt to balance the positive and negative contributions to chromatic aberration they still have a number of drawbacks. For example, the residual chromatic aberration is generally larger than desired. Also, both achromatic and apochromatic prisms, because of the different prism components and materials, are generally bulky, complicated and expensive.

Thus it would be desirable to provide achromatic prisms and apochromatic prisms with a simplified construction. It would also be desirable to provide achromatic and apochromatic prisms having improved performance with extremely small residual chromatic and anamorphic aberrations.

SUMMARY OF THE INVENTION

In accordance with the present invention an apochromatic dispersive optical element comprises a first prism having first and second faces that form a first prism and a second prism having third and fourth faces that form a second prism angle. The second face of the first prism and the first face of the second prism oppose and are parallel to each other. A grating is disposed on to either the first face of the first prism or the fourth face of the second prism, and has a predetermined grating period such that the primary and secondary angular spread for a given spectral band is approximately zero. As a result of the unique properties of both a prism and a grating, achromatic and apochromatic prisms having a minimal amount of residual chromatic and anamorphic aberrations can be constructed.

BRIEF DESCRIPTION OF THE DRAWINGS

The various advantages of the present invention will become apparent to those skilled in the art after a study of the following specification and by reference to the drawings in which.

DETAILED DESCRIPTION OF THE PREFERRED EMBODIMENT

Figure 1:
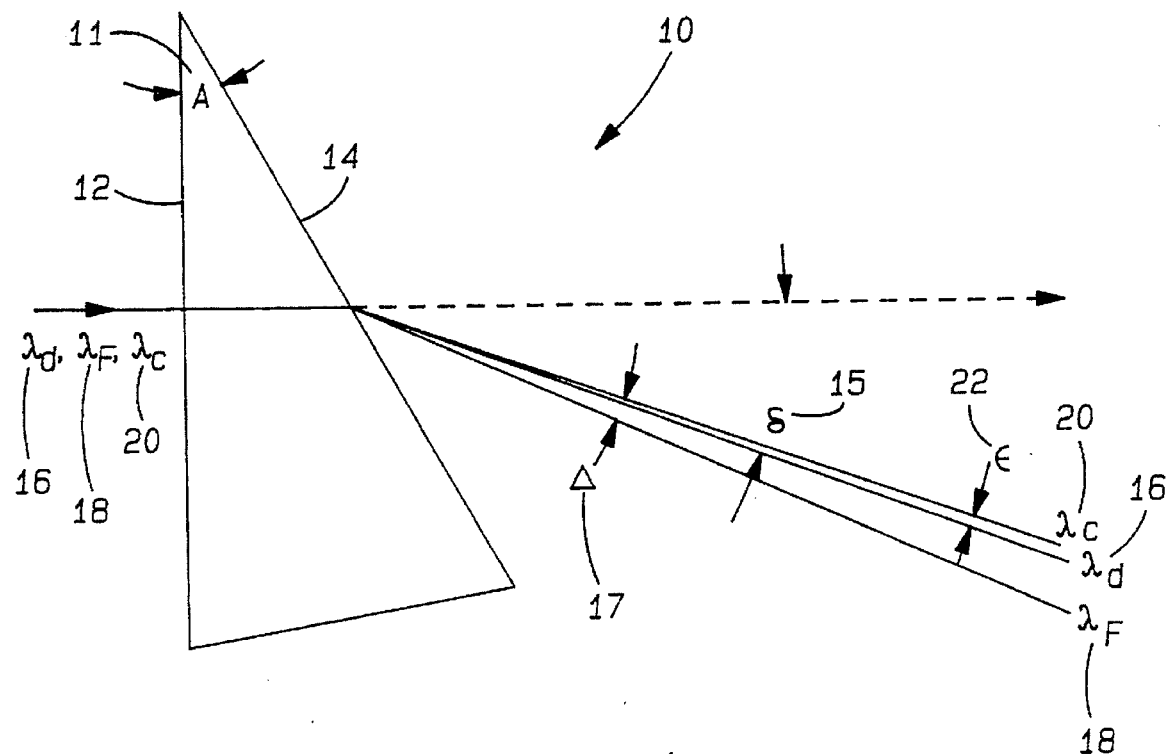
FIG. 1 is a schematic of a prism illustrating with both primary and secondary angular spreads for its beam deviation.

Referring now to FIG. 1, a typical prism 10 is shown with a prism angle 11 (A) between first and second faces 12, 14 respectively. The beam deviation angle 15 ($\delta$) is defined as the angular difference between the light beam incident on the prism and the light beam emerging from the prism for a middle wavelength 16 ($\lambda_d$) of the spectral band of light. The primary angular spread 17 ($\Delta$) is defined as the output angle difference between the short wavelength 18 ($\lambda_F$) and the long wavelength 20 ($\lambda_c$). The secondary angular spread 22 ($\epsilon$) is defined as the output refractive angular difference between the long wavelength 20 ($\lambda_c$) and the middle wavelength 16 ($\lambda_d$).

An achromatic prism, by definition, has no primary angular spread. An apochromatic prism has no primary angular spread and no secondary angular spread. Although an apochromatic prism has no primary and secondary angular spread, it still has residual chromatic angular errors for those wavelengths different from the three design wavelengths. These residual chromatic angular errors often are the main chromatic aberration which restricts the use of the prism for certain applications.

Figure 2:
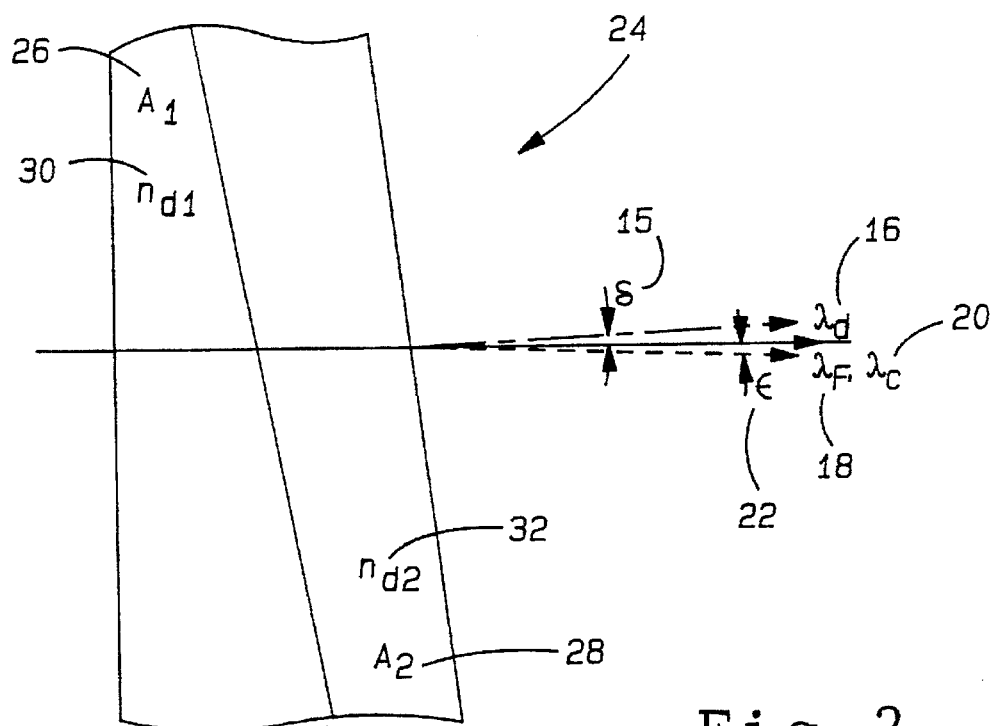
FIG. 2 is a schematic of an all-refractive achromatic prism.

FIG. 2 shows an achromatic prism 24 with prism angles 26 and 28 ($A_1$ and $A_2$), indices of refraction 30 and 32 ($n_{d1}$ and $n_{d2}$) for the middle wavelength 16 ($\lambda_d$), Abbe numbers $V_1$ and $V_2$, and partial dispersion coefficient $P_1$ and $P_2$ for the spectral band from the short wavelength 18 ($\lambda_F$) to the long wavelength 20 ($\lambda_c$). If the beam deviation angle 15 ($\delta$) and the secondary angular spread 22 ($\epsilon$) are as indicated in FIG. 2, an achromatic prism satisfies the following relationships:

$$A_1 = \left( \frac{1}{V_1 - V_2} \right) \left( \frac{V_1}{n_{d1} - 1} \right) \delta \quad (1)$$

$$A_2 = \left( \frac{1}{V_1 - V_2} \right) \left( \frac{V_2}{n_{d2} - 1} \right) \delta \quad (2)$$

$$\epsilon = \left( \frac{P_1 - P_2}{V_1 - V_2} \right) \delta \quad (3)$$

Figure 3:
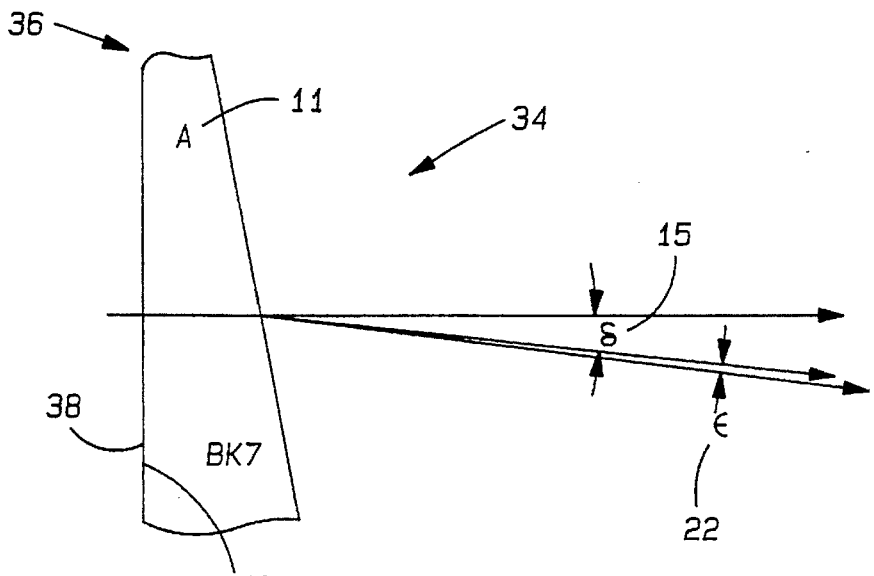
FIG. 3 is a schematic of a refractive-diffractive achromatic grism in accordance with the present invention.

Referring now to FIG. 3, a "grism" 34 in accordance with the present invention is shown. In essence, a grism is a combination of a grating and prism. Thus, the grism 34 in FIG. 3 is comprised of a prism 36 and a grating 38. In this embodiment, the grating 38 is attached to the first surface 40 of the prism 36. For further details about grisms and their design reference is made to co-pending U.S. Patent Application Ser. No. 07/993,344 entitled "A Grism (Grating—Prism Combination)".

For a diffraction grating such as the one 38 in FIG. 3, the Abbe number ($V_g$) and partial dispersion coefficient ($P_g$) are reduced to the following equations:

$$V_g = \frac{\lambda_d}{\lambda_f - \lambda_c} < 0 \quad (4)$$

$$P_g = \frac{\lambda_d - \lambda_c}{\lambda_f - \lambda_c} > 0 \quad (5)$$

Therefore, for an achromatic grism 34, the first order solution of the prism angle 11 (A), the grating period T and the secondary angular spread 22 ($\epsilon$) are:

$$A = \left( \frac{1}{V_1 - V_g} \right) \left( \frac{V_1}{n_{d1} - 1} \right) \delta \quad (6.a)$$

$$T = \left( \frac{V_1 - V_g}{V_g} \right) \delta V_d \quad (6.b)$$

$$\epsilon = \left( \frac{P_1 - P_g}{V_1 - V_g} \right) \delta \quad (7)$$

Also, the index of refraction (n) as a function of wavelength can be approximated as:

$$n = A_1 + A_2 \lambda^{-2} + A_3 \lambda^{-4} + A_4 \lambda^2 + A_5 \lambda^4 + \ldots \quad (8)$$

From the above derived equations, Table 1 summarizes the Abbe numbers (V) and partial dispersion coefficient (P) for two well-known refractive materials (BK7 and F2) and for a diffractive grating.

TABLE I

ABBE NUMBER AND PARTIAL DISPERSION COEFFICIENT FOR REFRACTIVE AND DIFRRACTIVE OPTICAL ELEMENTS

|   | BK7 | F2 | Diffractive Grating |
|---|---|---|---|
| V | 64.17 | 36.37 | −3.45 |
| P | 0.3075 | 0.2937 | 0.4036 |

The secondary angular spread-to-beam deviation angle ratio, $\epsilon/\delta$, is significant because it reveals the chromatic aberration with respect to the prismatic power. Accordingly, a desirable secondary angular spread-to-beam deviation angle ratio would be one that is close to zero.

From equation (3) and Table 1, the secondary angular spread-to-beam deviation angle ratio, $\epsilon/\delta$, for a BK7-F2 achromatic prism is $4.964 \times 10^{-4}$. Similarly, the secondary angular spread-to-beam deviation angle ratio, for a BK7-grating achromatic prism is $-1.5826 \times 10^{-3}$. It should be noted that the algebraic sign of the secondary angular spread-to-beam deviation angle ratio, $\epsilon/\delta$, for a conventional achromatic prism is opposite to that of a refractive-diffractive achromatic grism. The opposite algebraic sign in secondary angular spread 22 between an all-refractive prism and a refractive-diffractive grism can make the secondary chromatic aberration correction perfect. In addition, the magnitude of the secondary angular spread-to-beam deviation angle ratio, $\epsilon/\delta$, for a refractive-diffractive achromatic grism is much larger than that of an all-refractive achromatic prism.

Combining one classical achromatic prism and one grism (where the secondary angular spread 22 of both the prism and grism have opposite algebraic signs) yields a total prism assembly which is apochromatic. Therefore, for a fixed beam deviation angle, the required prismatic power for a refractive-diffractive apochromatic prism is much smaller than that of an all-refractive apochromatic prism (The prismatic power indicates a prism's ability to alter the deviation angle). Consequently, the aberrations introduced by refractive-diffractive apochromatic grisms are much smaller than that of the all-refractive prism.

Referring again to FIG. 3, the refractive-diffractive achromatic grism 34 has a prism angle 11 of ten degrees and a grating 38 frequency of 212.401 lines per inch. The beam deviation angle 15 is 15.558 degrees with a secondary angular spread 22 is 0.008 degrees.

Figure 4:
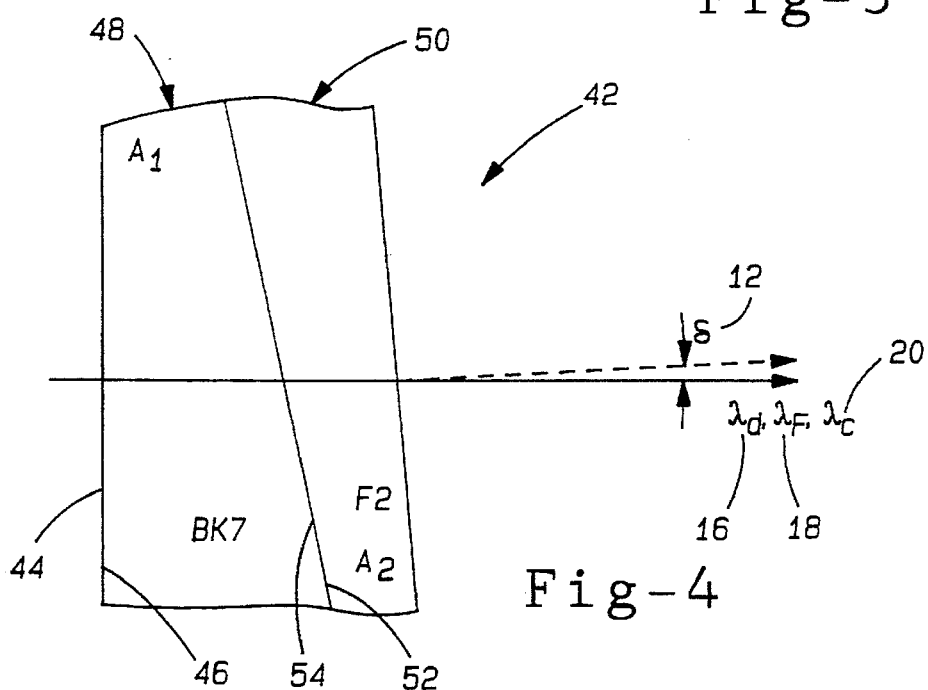
FIG. 4 is a schematic of an apochromatic refractive-diffractive grism in accordance with the present invention.

In FIG. 4, a refractive-diffractive apochromatic grism 42 includes a diffractive grating 44 with a spatial frequency of 29.5858 lines per inch etched on the front surface 46 of a first prism 48. A second prism 50 has its front surface attached to the rear surface 54 of the first prism 48. The prism angles $A_1$ and $A_2$ are 11.1407 degrees and 4.561 degrees for the first and second prisms (48, 50) respectively. First prism 48 is made of BK7 material and second prism 50 is made of F2 material. The beam deviation angle 15 is 8.4157 degrees with almost perfect correction for the secondary spectrum. The advantages of the refractive-diffractive apochromatic grism 42 over an all-refractive apochromatic prism include: (1) excellent secondary color correction with very little residual angular spread for any wavelength within the design spectral band, (2) a need for only two different refractive materials, without the need of any special glass material, (3) a very simple grism assembly and (4) a small prism angle; whereby, the prismatic power induced aberrations are very small.

Figure 5:
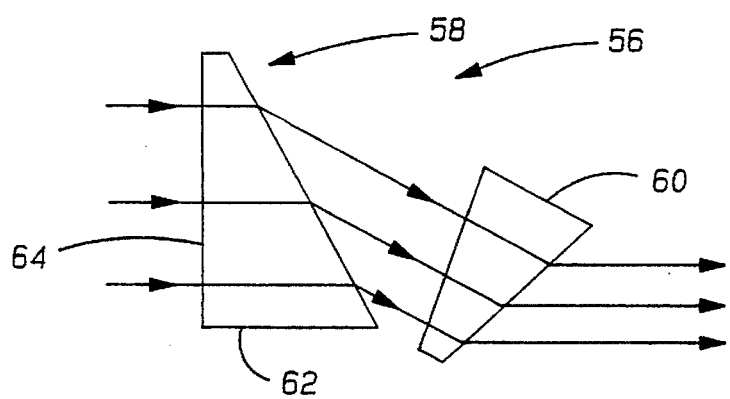
FIG. 5 is a diagram of a variable power anamorphic grism in accordance with the present invention.

FIG. 5 shows yet another embodiment of the present invention: a variable power anamorphic grism apparatus 56 is shown. The term "Anamorphic" means that different optical magnification is produced along mutually perpendicular direction. It will be appreciated that the magnification of an afocal optical system is given by the ratio of the diameters of its entrance and exit pupils. A refracting prism, used at other than minimum deviation has different sized exit and entrance beams, and thus produces a magnification in the meridian in which it produces a deviation. Thus a single prism may be used as an anamorphic system. To eliminate the angular deviation, two prisms arranged so that their deviations cancel and their magnifications combined are usually used. FIG. 5 illustrates a compound anamorphic grism system 56 made up of a grism 58, and a prism 60. The grism 58 comprises a prism 62 and a diffraction grating 64 attached to its front surface. Since the "magnification" of a prism is a function of the angle at which the beam enters the prism, a variable power anamorphic can be made by rotating the prisms in such a way that their deviations always cancel.

Prism anamorphic systems are "in focus" and free of axial stigmatism only when used in parallel light. The advantage of using a grism in the anamorphic system 56 is that the primary and secondary chromatic aberrations can be well corrected with a very small residual chromatic aberration for those wavelengths different from those three design wavelengths. Additionally, the anamorphic prism assembly is very compact. Alternatively, the element 58 can be an apochromatic grism.

It should be noted that the construction of a grism is not limited to the particular configuration shown above. For example, the diffraction grating may be attached to the rear rather than the front surface of the prism. Also, the grating may be etched onto the prism surface, attached or bonded in some manner, or merely placed adjacent to the prism. Those skilled in the art can appreciate that other advantages can be obtained from the use of this invention and that modification may be made without departing from the true spirit of the invention after studying the specification, drawings and following claims.

What is claimed is:

1. A grism system for performing apochromatic correction of at least three colors within a given spectral band, said band being defined by a long wavelength and a short wavelength and having a bandwidth-to-short wavelength ratio of at least 10%, the system comprising:

an achromatic prism assembly, said assembly further comprising a first prism that transmits energy over the entirety of said band, the first prism having first and second faces disposed at a first prism angle A1 and a second prism that transmits energy over the entirety of said band, the second prism having first and second faces disposed at a second prism angle A2;

a grating on either face of the first prism, the grating having a predetermined grating period, the first and second prisms and grating cooperating to change the angle of at least three colors within said band such that the primary and secondary angular spread for the given spectral band is approximately zero.

2. The system of claim 1 wherein the prisms have high positive Abbe numbers and the grating has a low negative Abbe number; whereby residual chromatic angular spread of the grism is minimized.

3. The system of claim 1 wherein the first and second prisms are made of glass material.

4. The system of claim 1 wherein the first prism and the second prism are made of infrared transmitting material.

5. The system of claim 1 wherein the grating is etched onto a face of either the first prism or the second prism.

6. The grism of claim 4 wherein one prism is made of BK7 material and the other prism is made of F2 material.

7. The system of claim 1 wherein the grating is etched onto the face of the first prism.

8. The system of claim 1 wherein the second prism has a second grating adjacent to one of its faces.

9. The system of claim 1 wherein the second prism has a second grating adjacent to one of its faces, wherein Abbe numbers V1 and V2 of the first and second prisms and the partial dispersion coefficients P1 and P2 of the first and second prisms are selected in conjunction with a predefined grating period of the first and second gratings to yield a pair of grism assemblies, wherein the primary angular spread is corrected, the secondary angular spread is also corrected, and the residual chromatic angular spread of the system is minimized.

10. The grism system of claim 1 wherein said at least three colors are transmitting by said first and second prisms and grating along a common path.

* * * * *